United States Patent [19]

Miyahara et al.

[11] 4,427,027

[45] * Jan. 24, 1984

[54] LIQUID STORAGE TANK

[75] Inventors: Akimitsu Miyahara, Tokyo; Toshihiko Kanazawa, Sagamihara; Kokaji Takahashi, Fujisawa; Hiroji Ushikubo, Ageo; Kuniaki Kawano, Matsudo, all of Japan

[73] Assignee: Japan Organo Co., Ltd., Tokyo, Japan

[ * ] Notice: The portion of the term of this patent subsequent to Jun. 22, 1999 has been disclaimed.

[21] Appl. No.: 346,122

[22] Filed: Feb. 5, 1982

Related U.S. Application Data

[63] Continuation-in-part of Ser. No. 189,302, Sep. 22, 1980, Pat. No. 4,335,746.

[51] Int. Cl.$^3$ .............................................. E03B 11/00
[52] U.S. Cl. .................................................. 137/576
[58] Field of Search ............... 137/573, 574, 575, 576, 137/587

[56] References Cited

U.S. PATENT DOCUMENTS

| | | | |
|---|---|---|---|
| 628,581 | 7/1899 | Grosswyler | 137/575 |
| 1,307,609 | 6/1919 | Yarnell | 137/575 |
| 2,311,862 | 2/1943 | Palmquist | 137/576 |
| 2,316,729 | 4/1943 | Tryon | 137/573 |
| 2,676,668 | 4/1954 | Lindsay | 137/576 |
| 2,704,206 | 3/1955 | Crook | 137/575 |
| 3,396,748 | 8/1968 | Hatakeyama et al. | 137/587 |
| 3,484,849 | 12/1969 | Huebner et al. | 137/575 |
| 4,335,746 | 6/1982 | Miyahara et al. | 137/576 |

FOREIGN PATENT DOCUMENTS

| | | |
|---|---|---|
| 45-24807 | 8/1970 | Japan . |
| 46-5782 | 10/1971 | Japan . |
| 51-01140 | 11/1976 | Japan . |
| 53-26336 | 10/1978 | Japan . |
| 53-88335 | 9/1978 | Japan . |
| 1083500 | 7/1964 | United Kingdom . |

Primary Examiner—Alan Cohan
Assistant Examiner—John A. Rivell
Attorney, Agent, or Firm—Armstrong, Nikaido, Marmelstein & Kubovcik

[57] ABSTRACT

A liquid storage chamber having a plurality of stages formed by horizontal partition plates which divide the space in the tank into a plurality of storage chambers. The partition plates have openings at their alternating ends so that the liquid supplied to the tank can flow down through the successive liquid storage chamber in a serpentine manner. The liquid storage chamber further has an opening flow setting plate having a multiplicity of liquid passage ports and disposed in each opening for making the liquid flow laminar through each opening and a storage chamber flow setting plate having a multiplicity of flow passage ports and disposed in each liquid storage chamber for making the liquid flowing horizontally in each liquid storage chamber flow in the form of a laminar flow. Consequently, liquids introduced into the tank exhibiting a chromatographic concentration distribution are stored in such a manner as to avoid the mixing of liquids of different components and concentrations due to stirring and convection, in the order of introduction to the tank, and are discharged in the same order as the introduction to the tank.

9 Claims, 1 Drawing Figure

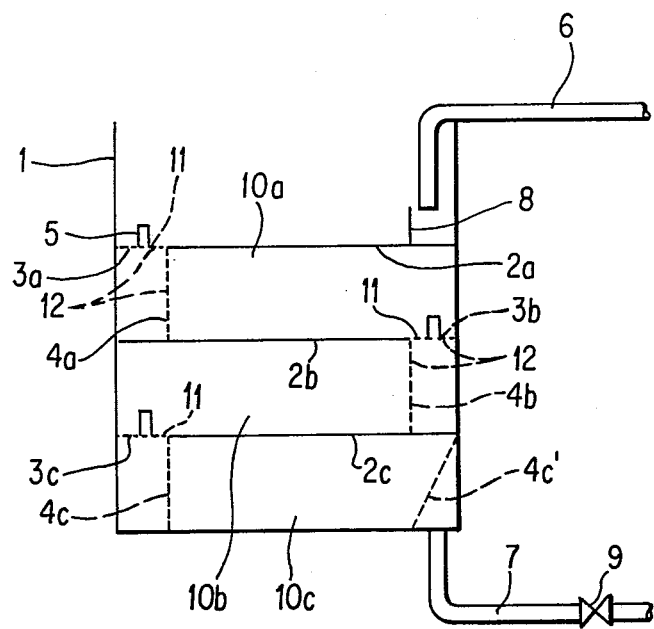

LIQUID STORAGE TANK

This application is a Continuation-in-part of U.S. patent application Ser. No. 189,302 filed Sept. 22, 1980 now U.S. Pat. No. 4,335,746 which issued on June 22, 1982.

BACKGROUND OF THE INVENTION

1. Field of the Invention

The present invention relates to a liquid storage tank having a multiplicity of stages of partition plates incorporating laminar-flow setting plates arranged in an appropriate manner. More particularly, the invention is concerned with a liquid storage tank adapted for use in a system having an absorbing tower through which a mixture liquid having a plurality of components is circulated. The liquid flows out of the adsorbing tower with each component exhibiting a chromatographic concentration distribution. The components are repeatedly circulated through the adsorbing tower in the order or sequence of the flowing out, so that the multiplicity of components are further separated from one another.

The invention aims at providing a liquid storage tank of the kind described for receiving liquid flowing from such a tower exhibiting a chromatographic concentration distribution in the order or sequence of the flowing in such a manner as to avoid the mixing of liquids of different contents and concentrations due to stirring or convection. The tank also permits discharging the liquid in the order of the concentration of the components.

2. Description of the Prior Art

In the conventional liquid storage tank of the kind described, the space in the tank is divided into a plurality of storage chambers by means of a plurality of stages of horizontal partition plates. These partition plates are provided at their alternating sides in a staggered manner with openings for allowing the liquid to flow down therethrough, such that, when the partition plate of the uppermost stage has an opening at its one side, the partition plate of the next stage is provided with its opening at the opposite side. The liquid is introduced into the tank from the upper side thereof, and is made to flow down through the chambers successively to fill the chambers from the lowermost one upwards. After a stay for a predetermined period, the liquid is discharged from the lower end of the tank.

In this type of liquid storage tank, it is possible to fill the tank with the liquids from the bottom in the order of flow into the tank and to store the liquids while avoiding the mixing of the liquids due to stirring and convection by means of the partition plates. However, as the liquids are extracted from the bottom of the tank, a non-uniform flow takes place in each chamber defined by the partition plates such that the lower part of the liquid flows faster than the upper part of the liquid in each chamber. In consequence, the liquid which has been stored in the upper part of the tank flows down outpacing the upper part of the liquid which was stored in each of the underlying chambers. For this reason, it is not possible to discharge the liquids in the order in which the liquids have been introduced into the tank.

SUMMARY OF THE INVENTION

The present invention aims at obviating the above-described shortcoming of the prior art.

To this end, according to the invention, there is provided a liquid storage tank having a multiplicity of horizontal partition plates dividing the space in the tank into a plurality of storage chambers, the partition plates having at alternating or staggered sides openings for allowing the liquids to flow therethrough, in such a manner that the partition plate of the uppermost stage has its opening at one side and the partition plate of the second stage has its opening at the opposite side, characterized by comprising a plurality of opening flow setting plates having a plurality of liquid passage apertures and disposed at each of the openings, and a plurality of storage chamber flow setting plates having a plurality of liquid passage ports and disposed at any desired portion of each of the liquid storage chambers.

BRIEF DESCRIPTION OF THE DRAWINGS

The attached sole FIGURE is a longitudinal sectional view of a liquid storage tank constructed in accordance with an embodiment of the invention.

DESCRIPTION OF THE PREFERRED EMBODIMENTS

The invention will be described hereinunder with reference to the accompanying drawing. A liquid storage tank 1 has a multiplicity of stages of horizontal partition plates 2 disposed at a suitable pitch in the tank 1 so as to divide the space in the tank 1 into a multiplicity of storage chambers 10. The partition plates are provided at their alternating ends with openings 11 for allowing the liquids to flow down therethrough, in such a staggered manner that the partition plate 2a of the uppermost stage has its opening 11 at one end thereof, while the partition plate 2b of the second stage has its opening at its other end. Subsequent partition plates starting from the third one 2c have their openings 11 in the same staggered manner. Each opening 11 is provided with an opening flow setting plate 3, while each liquid storage chamber 10 defined by the partition plates 2 is provided at any desired portion thereof with a storage chamber flow setting plate 4. Each of the flow setting plates 3 and 4 are provided with liquid passage ports 12 such as apertures shaped as slits or as any other desired shape which permits the liquid to flow therethrough while setting the flow of the liquid, i.e. generating laminar flow of the liquid. The total area of the liquid passage ports preferably occupies about 5 to 20% of the total area of the flow setting plate 3 and 4. The storage chamber flow setting plates may be provided in singly or plurally at one or more portions of each storage chamber in a vertical or an inclined posture. It is, however, preferred that at least one storage chamber flow setting plate 4 is disposed just beneath the juncture between the partition plate 2 and the opening flow setting plate 3 as in the illustrated embodiment. This is because, by so doing, a remarkable flow setting effect is obtained. A reference numeral 5 denotes an air purge pipe provided to open at any desired portion of each partition plate 2 or the opening flow setting plate 3. The air purge pipe 5 has a height which preferably is not greater than 50% of the storage chamber 10.

The liquid level in a storage chamber is less than the height of a pipe 5 so that no liquid flows down pipe 5 to a lower storage chamber.

A reference numeral 6 denotes a liquid inlet pipe, while a liquid outlet pipe having a valve 9 is designated at a reference numeral 7. An overflow dam 8 is provided at the liquid inlet side of the liquid storage tank 1.

The liquid storage tank 1 of the invention operates in a manner explained hereinunder. The valve 9 of the outlet pipe 7 is closed, and the multi-component liquid flowing with a chromatographic concentration distribution is made to flow into the liquid storage tank 1 through the inlet pipe 6. As a result, the liquid overflows the overflow dam 8 and flows down successively through the storage chambers 10a, 10b, 10c. In the course of this flow of the liquid, the flow is set in the state of laminar flow because the liquid passes through the opening flow setting plates 3a, 3b, 3c and the storage chamber flow setting plates 4a, 4b, 4c, 4c' so as to fill up the lowermost storage chamber 10c and then the upper chamber 10b and 10a successively. The flowing velocity of the liquid coming into the tank 1 is preferably selected to fall between about 0.2 and 2 cm/sec in relation to the cross-section of the storage chamber 10. The air in the tank is displaced by the liquid and discharged to the outside of the tank 1 through the air purge pipe 5, so that each chamber 10 can be smoothly filled up.

In the liquid storage tank of the invention, since the space in the tank 1 is divided into a plurality of storage chambers 10 by the partition plates 2 and since the opening flow setting plates 3 and the storage chamber setting plates 4 are provided, it is possible to store the liquids of different contents and concentrations in respective chambers 10, without permitting the mixing of these liquids due to stirring action caused by the flow of liquid and convection.

The conventional storage tank having only the partition plate cannot prevent the mixing of the liquid due to diffusion. However, according to the invention, the rate of mixing due to diffusion of liquid is minimized because of the provision of the opening flow setting plates 3 and the storage chamber flow setting plate 4.

The supply of liquid from the inlet pipe 6 is stopped after the liquid storage tank 1 is filled with a predetermined amount of liquid. Then, the valve 9 of the outlet pipe 7 is opened to allow the liquid to be discharged from the liquid storage tank 1. During the discharge of the liquid, the liquid flowing down through the opening 11 takes the form of laminar flow because it flows through the opening flow setting plate 3. Also, the horizontal flow of liquid in each chamber 10 is made to take the form of laminar flow as it flows through the storage chamber flow setting plate 4. In consequence, the liquid flows uniformly in each liquid storage chamber 10 and the liquids are discharged in order such that the liquid which has stayed in the lowermost chamber is discharged first and then the liquids in the overlying chambers are successively discharged, i.e. in the order of concentration distribution of the multi-component liquid which has flown into the liquid storage tank 1. It is preferred that the velocity of the liquid discharged from the tank 1 is selected to be 0.2 to 2 cm/sec. in relation to the cross-section of the storage chamber 10, as in the case of velocity flowing into the tank 1.

Several successful embodiments of the present invention are given hereinbelow. In each of the three examples, the overall dimensions of the liquid storage tank are 3,000 mm in length and 6102 mm in height. The tank body, partition plates, flow setting plates, and the air purge valves were all made of Type 304 stainless steel.

EXAMPLE ONE

A first storage tank was constructed having the above noted length and height and a width of 700 mm. This produced a storage tank having a volume of 12.78 cubic meters. Eight partition plates were provided laterally dividing the storage tank into 9 storage chambers. Each partition plate was 700 mm wide, 3,000 mm long, and 2 mm thick. Each of the separate storage chambers had a volume of 1.42 cubic meters.

Each of the partition plates has an opening flow setting plate therein having a width of 700 mm and a length of 270 mm. Each opening flow setting plate has 73 liquid passage ports, each with a diameter of 22 mm. Thus, the total area of liquid passage ports in ratio to the area of the opening flow setting plate is 14.6%.

Each storage chamber defined by the partition plates has a storage chamber flow setting plate therein having a width of 700 mm and a height of 678 mm and is 2 mm thick. Each storage chamber flow setting plate is positioned 400 mm away from the side wall of the storage tank adjacent the opening flow setting plate. Each of the storage chamber flow setting plates has 19 liquid passage ports therein. In the upper three storage chambers of this example, the liquid passage ports in the storage chamber flow setting plates have a diameter of 50 mm; in the middle three storage chambers, the liquid passage ports have a diameter of 45 mm; and in the bottom three storage chambers, the liquid passage ports in the storage chamber flow setting plates have a diameter of 35 mm. Thus, the ratio of the area of liquid passage ports to the area of the storage chamber flow setting plates overall is 18.06%.

An air purge valve is provided on each opening flow setting plate having a 20 mm diameter and a 300 mm height. The flow rate of liquid through the storage tank was set at 1.35 cm/sec.

EXAMPLE TWO

A second embodiment of the present invention was prepared and successfully tested which differed from Example One in only the following details.

The storage tank of the second embodiment had a width of 860 mm and thus, a volume of 15.66 cubic meters. The partition plates utilized had a width of 860 mm and a length of 3,000 mm. The same number of partition plates were utilized thus, dividing the volume of the storage tank into 9 storage chambers each having a volume of 1.74 cubic meters.

The area of the opening flow setting plate was 860 mm wide by 220 mm long. Sixty-six liquid passage ports were provided in the opening flow setting plate, each having a diameter of 22 mm. The ratio of the total area of the liquid passage ports to the area of the opening flow setting plate was 13.3%. The positioning, the number of liquid passage ports, the size of liquid passage ports, and the installed position of each of the storage flow chamber setting plates was the same as in Example One. The only difference was the dimensions of the storage chamber flow setting plates which were 860 mm wide and 678 mm high. The ratio of the area of liquid passage ports to the area of the storage chamber flow setting plates was 14.76%. The flow rate of liquid through the storage tank was 1.09 cm/sec.

EXAMPLE THREE

A third embodiment of the present invention was prepared and successfully tested which differed from Example One in only the following details.

The storage tank of the third embodiment had a width of 1220 mm and thus, a volume of 22.32 cubic meters. The same number of partition plates were utilized dividing the storage tank into the same number of storage chambers. The dimensions of each partition plate were a width of 1220 mm and a length of 3,000 mm. The volume of each storage chamber thus defined was 2.48 cubic meters. The area of the opening in each partition plate for the opening flow setting plate was 1220 mm wide and 180 mm long. Each opening flow setting plate had 80 liquid passage ports therein each of 22 mm diameter. The ratio of total area of liquid passage ports to the area of the opening flow setting plate was 13.3%.

Each storage chamber has a storage chamber flow setting plate having a width of 1220 mm and a height of 678 mm. Each storage chamber flow setting plate was positioned in the same position as in Example One having the same number of liquid passage ports each with the same diameter as in Example One. Thus, the ratio of the areas of the liquid passage ports to area of the storage chamber flow setting plate was 10.36%. The flow rate of liquid through the storage tank was 0.76 cm/sec.

As has been described, according to the invention, the liquids flowing into the liquid storage tank while exhibiting a chromatographic concentration distribution are accumulated in the tank in such a manner as to fill the lowermost chamber first and then the overlying chambers successively, without permitting the mixing of liquids of different components and concentrations, because of the flow setting action of the opening flow setting plates and storage chamber flow setting plates which have liquid passage ports such as a multiplicity of openings or slits. At the same time, it is possible to discharge the liquids in the same order of components and concentrations as that of the liquids flowing into the tank. In the conventional liquid storage tank of the kind described having no flow setting plate, a highly complicated and difficult operation is required for controlling the velocities of the liquids flowing into and out of the tank. Such a problem, however, is completely overcome in the liquid storage tank of the invention, because of the provision of the opening flow setting plates and storage chamber flow setting plates.

According to the invention, it is possible to form a multiplicity of storage chambers in the tank, so that the number of the tanks is reduced to save the installation area and to lower the investment cost, as compared with the conventional system which employs a multiplicity of liquid storage tanks of comparatively small capacity and adapted to share the liquid to be stored.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore to be embraced therein.

What is claimed is:

1. In a liquid storage tank having a multiplicity of stages of horizontal partition plates which divide the space in said tank into a plurality of storage chambers, each storage chamber having a height, said partition plates having openings for allowing a liquid to flow down therethrough from the overlying chamber to the underlying chamber, said openings being arranged in a staggered manner such that the opening of the overlying partition plate is formed at one end of said tank while the opening of the underlying partition plate is formed at the other end of said tank;

an improvement which comprises means for generating laminar flow between chambers comprising a plate provided at each of said openings and having a multiplicity of liquid passage ports; storage chamber means for generating laminar flow across chambers comprising a flow setting plate vertically provided in each of said liquid storage chambers and having a multiplicity of liquid passage ports; and an air purge pipe provided in each partition plate.

2. A liquid storage tank as claimed in claim 1 wherein at least one storage chamber means is disposed in said liquid storage chamber, one of said flow setting plates being disposed just beneath said juncture between said partition plate and said means between chambers.

3. A liquid storage tank as claimed in claim 1 or 2, wherein the velocity of said liquid flowing into said tank and the velocity of said liquid flowing out of said tank are selected to fall within the range of between 0.2 and 2 cm/sec. in relation to the cross-section of said storage chamber.

4. A liquid storage tank as claimed in any one of claims 1 or 2 wherein the total area of said liquid passage ports of each plate is about 5 to 20% of each plate.

5. A liquid storage tank as claimed in claim 3 wherein the total area of said liquid passage ports of each plate is about 5 to 20% of each plate.

6. A liquid storage tank as claimed in claim 1, wherein each air purge pipe has a height not greater than 50% of said height of the storage chamber into which it projects.

7. A liquid storage tank as claimed in claim 1, wherein said horizontal partition plates equally divide said tank into nine storage chambers.

8. A liquid storage tank as claimed in claim 1, wherein said liquid passage port in said flow setting plates has a diameter, and the diameters of the liquids passage ports of the lowermost flow setting plates are smaller than the diameters of the liquid passage ports in the uppermost flow setting plates.

9. A liquid storage tank as claimed in claim 1, wherein said liquid passage port has a diameter and the diameter of the liquid passage ports in said plates is 22 mm and the diameters of the liquid passage ports in said flow setting plates is within the range of 35 to 50 mm.

* * * * *